United States Patent

Gundlach et al.

[11] Patent Number: 5,958,120
[45] Date of Patent: Sep. 28, 1999

[54] INK COMPOSITIONS WITH IMPROVED WATERFASTNESS

[75] Inventors: Kurt B. Gundlach, Fairport; Richard L. Colt, Rochester; Luis A. Sanchez, Fairport, all of N.Y.

[73] Assignee: Xerox Corporation, Stamford, Conn.

[21] Appl. No.: 09/017,334

[22] Filed: Feb. 2, 1998

[51] Int. Cl.[6] .................................................. C09D 11/02
[52] U.S. Cl. ................................. 106/31.43; 106/31.27; 106/31.49; 106/31.58
[58] Field of Search .............................. 106/31.43, 31.49, 106/31.58, 31.27

[56] References Cited

U.S. PATENT DOCUMENTS

| | | | |
|---|---|---|---|
| 5,223,026 | 6/1993 | Schwarz, Jr. ......................... | 106/31.27 |
| 5,250,121 | 10/1993 | Yamamoto et al. ................. | 106/31.58 |
| 5,254,159 | 10/1993 | Gundlach et al. ................... | 106/31.43 |
| 5,300,143 | 4/1994 | Schwarz et al. ..................... | 106/31.43 |
| 5,358,558 | 10/1994 | Yamamoto et al. ................. | 106/31.58 |
| 5,389,131 | 2/1995 | Colt et al. ............................ | 106/31.27 |
| 5,428,383 | 6/1995 | Shields et al. ............................ | 347/96 |
| 5,431,722 | 7/1995 | Yamashita et al. ................. | 106/31.77 |
| 5,462,590 | 10/1995 | Yui et al. ............................. | 106/37.75 |
| 5,488,402 | 1/1996 | Shields et al. ............................ | 347/96 |

*Primary Examiner*—Helene Klemanski
*Attorney, Agent, or Firm*—Judith L. Byorick

[57] ABSTRACT

Disclosed is an ink composition which comprises (a) water; (b) a colorant selected from the group consisting of reactive dyes having terminal vinyl sulfate groups and mixtures thereof; (c) N,N'-bis(3-aminopropyl)-1,2-ethylenediamine; (d) imidazole; (e) phosphorous acid or a phosphite salt; (f) tripropylene glycol monomethyl ether; and (g) a salt selected from $Zn^{2+}$ salts and mixtures thereof. Also disclosed is an ink jet printing process employing the ink.

19 Claims, No Drawings

INK COMPOSITIONS WITH IMPROVED WATERFASTNESS

BACKGROUND OF THE INVENTION

The present invention is directed to ink compositions and to processes for the preparation and use thereof. More specifically, the present invention is directed to compositions suitable for use in ink jet printing processes. One embodiment of the present invention is directed to an ink composition which comprises (a) water; (b) a colorant selected from the group consisting of reactive dyes having terminal vinyl sulfate groups and mixtures thereof; (c) N,N'-bis(3-aminopropyl)-1,2-ethylenediamine; (d) imidazole; (e) phosphorous acid or a phosphite salt; (f) tripropylene glycol monomethyl ether; and (g) a salt selected from $Zn^{2+}$ salts and mixtures thereof.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

U.S. Pat. No. 5,254,159 (Gundlach et al.), the disclosure of which is totally incorporated herein by reference, discloses an ink composition which comprises water, an anionic dye, and a compound selected from the group consisting of N,N'-bis(3-aminopropyl)-1,2-ethylenediamine, 1,4-bis(3-aminopropyl)piperazine, N,N'-bis(3-aminopropyl)-1,3-propanediamine, N,N'-bis(2-amionethyl)-1,3-propanediamine, N,N'-bis(3-aminopropyl)-1,4-butanediamine, ethylenediamine, diethylenetriamine, triethylenetetramine, tetraethylenepentamine, nitrilotrisethylamine, N,N'-(diaminoethyl)piperazine, piperazinylethylethylenediamine, aminoethyltriethylenetetramine, aminoethylpiperazinylethylethylenediamine, piperazinylethyldiethylenetriamine, pentaethylene hexamine, and mixtures thereof, said ink composition having a pH of more than about 8 and less than about 9. Further disclosed is an ink composition comprises water, a dye, a polyamine compound, and a monoamine compound. In one embodiment, the polyamine compound is a first generation dendrimer compound having terminal primary amine groups.

U.S. Pat. No. 5,389,131 (Colt et al.), the disclosure of which is totally incorporated herein by reference, discloses a process for preparing an ink composition which comprises (a) forming a mixture by admixing water and a base; (b) adding a colorant to the mixture; and (c) adjusting the pH of the mixture by adding phosphorous acid thereto. Also disclosed is a process for preparing an ink composition which comprises (a) forming a mixture by admixing water and phosphorous acid; (b) adding a colorant to the mixture; and (c) adjusting the pH of the mixture by adding a base thereto. Further disclosed are ink compositions prepared by these processes. One embodiment is directed to an ink composition which comprises water, a colorant, and phosphorous acid. Another embodiment of the invention is directed to an ink composition which comprises water, a colorant, and a phosphite salt. Additionally disclosed are processes which comprise incorporating these inks into an ink jet printing apparatus and causing droplets of the ink to be ejected in an imagewise pattern onto a substrate. The presence of phosphorous acid and the base create a buffer system in the ink which adjusts the ink to the desired pH, and also enables improved latency, recoverability, and waterfastness.

U.S. Pat. No. 5,300,143 (Schwarz), the disclosure of which is totally incorporated herein by reference, discloses an ink composition which comprises water, a water soluble dye, a first component selected from the group consisting of sulfones and mixtures thereof, and a second component selected from the group consisting of cyclic amines having at least one hydrogen atom bonded to a nitrogen atom, cyclic amides having at least one hydrogen atom bonded to a nitrogen atom, diamides having at least one hydrogen atom bonded to a nitrogen atom, polyalkoxy-substituted amides having at least one hydrogen atom bonded to a nitrogen atom, polyimine-substituted amides having at least one hydrogen atom bonded to a nitrogen atom, and mixtures thereof. Also disclosed is an ink jet printing process employing these inks.

U.S. Pat. No. 5,223,026 (Schwarz), the disclosure of which is totally incorporated herein by reference, discloses a thermal ink jet printing process which comprises incorporating into a thermal ink jet printing apparatus an ink composition comprising a colorant and a liquid vehicle which comprises a mixture of water and an organic component selected from the group consisting of: (1) cyclic amides; and mixtures thereof; and heating selected nozzles in the printing apparatus containing the ink, thereby causing droplets of the ink to be ejected in an imagewise pattern onto a substrate.

U.S. Pat. No. 5,488,402 and U.S. Pat. No. 5,428,383 (Shields et al.), the disclosures of each of which are totally incorporated herein by reference, disclose a method for controlling color bleed in multi-color thermal ink jet printing systems. Color bleed involves the migration of coloring agents between adjacent zones in a multi-color printed image on a substrate. To control color bleed between any two ink compositions in a multi-ink system, at least one of the ink compositions will contain a precipitating agent (e.g. a multi-valent metal salt). The precipitating agent is designed to react with the coloring agent in the other ink composition of concern. As a result, when the two ink compositions come in contact, a precipitate is formed from the coloring agent in the other ink composition which prevents migration thereof and color bleed problems. This technique is applicable to printing systems containing two or more ink compositions, and enables distinct multi-color images to be produced without the problems normally caused by color bleed.

While known compositions and processes are suitable for their intended purposes, a need remains for improved ink compositions suitable for use in thermal ink jet printing processes. In addition, a need remains for ink compositions which exhibit improved waterfastness. Further, a need remains for ink compositions which exhibit reduced intercolor bleed. Additionally, a need remains for ink compositions which exhibit improved color quality. There is also a need for magenta ink compositions which exhibit improved color quality. In addition, there is a need for ink compositions which exhibit reduced wet smear.

SUMMARY OF THE INVENTION

It is an object of the present invention to provide ink compositions with the above noted advantages.

It is another object of the present invention to provide improved ink compositions suitable for use in thermal ink jet printing processes.

It is yet another object of the present invention to provide ink compositions which exhibit improved waterfastness.

It is still another object of the present invention to provide ink compositions which exhibit reduced intercolor bleed.

Another object of the present invention is to provide ink compositions which exhibit improved color quality.

Yet another object of the present invention is to provide magenta ink compositions which exhibit improved color quality.

Still another object of the present invention is to provide ink compositions which exhibit reduced wet smear.

These and other objects of the present invention (or specific embodiments thereof) can be achieved by providing an ink composition which comprises (a) water; (b) a colorant selected from the group consisting of reactive dyes having terminal vinyl sulfate groups and mixtures thereof; (c) N,N'-bis(3-aminopropyl)-1,2-ethylenediamine; (d) imidazole; (e) phosphorous acid or a phosphite salt; (f) tripropylene glycol monomethyl ether; and (g) a salt selected from $Zn^{2+}$ salts and mixtures thereof.

DETAILED DESCRIPTION OF THE INVENTION

Inks of the present invention contain an aqueous liquid vehicle, a colorant selected from the group consisting of reactive dyes having terminal vinyl sulfate groups and mixtures thereof, N,N'-bis(3-aminopropyl)-1,2-ethylenediamine, imidazole, phosphorous acid or a phosphite salt, tripropylene glycol monomethyl ether, and a salt selected from $Zn^{2+}$ salts and mixtures thereof. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.), and can also function as a cosolvent to improve dye solubility, a penetrant, a biocide, and/or a jetting aid. In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

Suitable dyes for the inks of the present invention include reactive dyes having terminal vinyl sulfate groups and mixtures thereof. Preferably, the reactive terminal vinyl sulfate group is present on from about 80 to about 99 percent of the dye molecules. Examples of suitable dyes include Reactive Red 180 dye, available from Hoechst as DUASYN BRILLIANT RED F3B SF VP 218, Reactive Yellow 37 dye, available from Hoechst as DUASYN BRILLIANT YELLOW GL-SF VP 220, and the like. Mixtures of two or more dyes in an ink composition can also be employed. The dye is present in the ink in any effective or desired amount, typically from about 0.5 to about 15 percent by weight of the ink, and preferably from about 1 to about 10 percent by weight of the ink, although the amount can be outside of these ranges.

Also contained in the ink compositions of the present invention is N,N'-bis(3-aminopropyl)-1,2-ethylenediamine. This material, of the formula

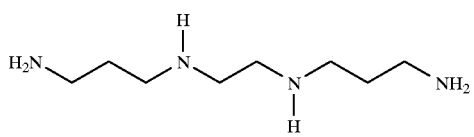

is present in any effective or desired amount, typically from about 0.05 to about 5 percent by weight of the ink, preferably from about 0.2 to about 3 percent by weight of the ink, and more preferably from about 0.4 to about 2 percent by weight of the ink, although the amount can be outside of these ranges.

Also contained in the ink compositions of the present invention is imidazole. Imidazole is present in the ink in any effective or desired amount, typically from about 1 to about 25 percent by weight of the ink, preferably from about 5 to about 20 percent by weight of the ink, and more preferably from about 10 to about 15 percent by weight of the ink, although the amount can be outside of these ranges.

Also contained in the ink compositions of the present invention is phosphorous acid or a phosphite salt. The ink composition is prepared by adding phosphorous acid to other ink ingredients; in the final ink composition, the added phosphorous acid can be in the original acid form, or it can convert to the phosphite salt form by reaction with other ink ingredients and/or by pH adjustment, the presence or addition of buffers, or the like. Phosphorous acid is added to the ink composition in any effective or desired amount, typically from about 0.1 to about 10 percent by weight of the ink composition, preferably from about 0.5 to about 5 percent by weight of the ink composition, and more preferably from about 1 to about 3 percent by weight of the ink composition, although the amount can be outside of these ranges. The final ink composition contains phosphite ions in any effective or desired amount, typically from about 0.075 to about 7.5 percent by weight of the ink composition, preferably from about 0.4 to about 4 percent by weight of the ink composition, and more preferably from about 1 to about 3 percent by weight of the ink composition, although the amount can be outside of these ranges.

Also contained in the ink compositions of the present invention is tripropylene glycol monomethyl ether. The tripropylene glycol monomethyl ether is present in the ink in any effective or desired amount, typically from about 2 to about 25 percent by weight of the ink composition, preferably from about 5 to about 20 percent by weight of the ink composition, and more preferably from about 10 to about 18 percent by weight of the ink composition, although the amount can be outside of these ranges.

Also contained in the ink compositions of the present invention is a salt selected from $Zn^{2+}$ salts and mixtures thereof. Any desired or suitable $Zn^{2+}$ salts can be employed, including those of the formulae

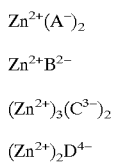

wherein A is a monovalent anion, B is a divalent anion, C is a trivalent anion, and D is a tetravalent anion, and the like. Examples of suitable zinc II salts include halide salts, such as zinc chloride, zinc bromide, and zinc iodide, zinc nitrate, zinc sulfate, zinc citrate, zinc salt of N,N-dimethylaminoethoxide, zinc salt of ethylene diamine tetraacetic acid (EDTA), and the like. The zinc salt is present in the ink in any effective or desired amount, typically from about 0.1 to about 20 percent by weight of the ink, preferably from about 0.5 to about 10 percent by weight of the ink, and more preferably from about 2 to about 6 percent by weight of the ink, although the amount can be outside of these ranges. The zinc salts, present in combination with the other ingredients indicated for inks of the present invention, enable advantages such as improved waterfastness.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

One example of an additive to the inks is a polymeric additive consisting of two polyalkylene oxide chains bound to a central bisphenol-A-type moiety. This additive is of the formula

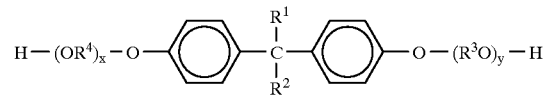

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, J. Molecular Science—Rev. Macromol. Chem. Phys., C25(3), 325–373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in thermal ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range.

Ink compositions of the present invention can be of any suitable or desired pH. For some embodiments, such as thermal ink jet printing processes, typical pH values are from about 7.75 to about 9.25, and preferably from about 8.25 to about 8.75, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering. When the zinc salt is added to the ink composition prior to addition of the phosphorous acid, a heavy exothermic precipitation of dye complex can occur; addition of the phosphorous acid to this heterogeneous system, however, immediately clarifies the ink. Addition of additional N,N'-bis(3-aminopropyl)-1,2-ethylenediamine into the ink subsequent to addition of the zinc salt can also aid in dissolution of any precipitated dye complex formed during the ink preparation process.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper. The improvement in waterfastness for inks of the present invention is observed both on alkaline-sized papers, such as the Xerox® Image Series papers, and on acid-sized papers, such as Courtland 4024 DP paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared by simple mixing of the following ingredients:

| Ingredient | Supplier | Amount (grams) |
| --- | --- | --- |
| deionized water | — | 521.5 |
| imidazole | Aldrich Chemical Co. | 150 |
| N,N'-bis(3-aminopropyl)-1,2-ethytenediamine | BASF | 12 |
| DOWICIL 150 biocide | Dow Chemical Co. | 1 |
| polyethytene oxide* | Polysciences Corp. | 0.5 |
| tripropylene glycol monomethyl ether (DOWANOL TPM) | Dow Chemical Co. | 180 |
| DUASYN BRILLIANT RED F3B SF VP 218 (Reactive Red 180) | Hoechst | 35 |
| phosphorous acid | Rhone Poutenc | 17.29 |
| zinc chloride | Aldrich Chemical Co. | 50 |
| additional deionized water roll mill 30 minutes | — | 32.67 |

*bisphenol-A derivative, molecular weight 18,500 of the formula

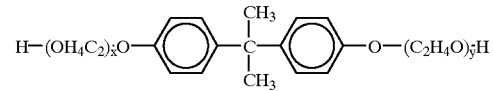

The ink composition was filtered through a 0.2 micron 142 millimeter Gelman Nylaflow filter at 40 pounds per square inch. The resulting ink composition exhibited a viscosity of 4.45 centipoise at 25° C., a pH of 7.93 at 24° C., a surface tension of 40.6 dynes per centimeter, and a conductivity of 15.02 millimhos.

The ink composition thus prepared was incorporated into a HEWLETT-PACKARD® HP 694 thermal ink jet printer and used to print two-colored images onto XEROX® Image Series Elite paper (felt side) and Courtland 4024 paper (felt side), with the ink composition of the present invention used to generate the magenta portions and the carbon-black-containing ink supplied with the HP 694 printer used to generate the black portions. The MFLEN value between the black and magenta images was 6 on the XEROX® Image Series Elite paper and 7 on the Courtland 4024 paper, indicating excellent characteristics with respect to intercolor bleed. Waterfastness of the magenta images was tested by two methods. First, waterfastness was tested by measuring the optical density of the image, immersing the image in deionized water for 5 minutes, measuring the optical density of the image subsequent to water immersion, and calculating waterfastness as $(OD_{after\ immersion} \div OD_{before\ immersion}) \times 100$. Waterfastness of the magenta images as tested by this method was 83 percent on both the XEROX® Image Series Elite paper and the Courtland 4024 paper. It is believed that the dye was absorbed further into the paper fibers subsequent to soaking by this method. Waterfastness was also tested by holding the paper upright, allowing water to run across the image, and subsequently measuring the optical density of the area immediately below the image to determine the degree of ink washed from the image onto the adjacent area of the paper. When tested by this method, waterfastness of the magenta images was 99 to 100 percent (i.e., the optical density of the area immediately below the washed image was the same as the optical density of the unprinted paper) on both the XEROX® Image Series Elite paper and the Courtland 4024 paper.

EXAMPLE II

An ink composition was prepared by simple mixing of the following ingredients:

| Ingredient | Supplier | Amount (grams) |
|---|---|---|
| deionized water | — | 521.5 |
| imidazole | Aldrich Chemical Co. | 150.12 |
| N,N'-bis(3-aminopropyl)-1,2-ethylenediamine | BASF | 12.01 |
| DOWICIL 150 biocide | Dow Chemical Co. | 1 |
| polyethylene oxide* | Polysciences Corp. | 0.5 |
| tripropylene glycol monomethyl ether (DOWANOL TPM) | Dow Chemical Co. | 180 |
| phosphorous acid | Rhone Poulenc | 18.2 |
| additionat deionized water | — | 31.67 |
| DUASYN BRILLIANT YELLOW GL-SF VP 220 (Reactive Yellow 37) | Hoechst | 35 |
| zinc chloride | Aldrich Chemical Co. | 50.03 |
| roll mill 30 minutes | | |

*bisphenol-A derivative, molecular weight 18,500 of the formula

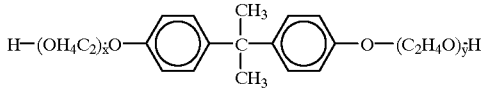

The ink composition was filtered through a 0.2 micron 142 millimeter Gelman Nylaflow filter at 40 pounds per square inch over a period of 6 minutes and 37 seconds. The resulting ink composition exhibited a viscosity of 5.01 centipoise at 25° C., a pH of 7.68 at 25° C., a surface tension of 38.8 dynes per centimeter, and a conductivity of 19.31 millimhos.

The ink composition thus prepared was incorporated into a HEWLETT-PACKARD® HP 694 thermal ink jet printer and used to print two-colored images onto XEROX® Image Series Elite paper (felt side) and Courtland 4024 paper (felt side), with the ink composition of the present invention used to generate the yellow portions and the carbon-black-containing ink supplied with the HP 694 printer used to generate the black portions. The MFLEN value between the black and yellow images was 8 on the XEROX® Image Series Elite paper and 5 on the Courtland 4024 paper, indicating excellent characteristics with respect to intercolor bleed. Waterfastness of the yellow images was tested by two methods. First, waterfastness was tested by measuring the optical density of the image, immersing the image in deionized water for 5 minutes, measuring the optical density of the image subsequent to water immersion, and calculating waterfastness as $(OD_{after\ immersion} \div OD_{before\ immersion}) \times 100$. Waterfastness of the yellow images as tested by this method was 89 percent on both the XEROX® Image Series Elite paper and the Courtland 4024 paper. It is believed that the dye was absorbed further into the paper fibers subsequent to soaking by this method. Waterfastness was also tested by holding the paper upright, allowing water to run across the image, and subsequently measuring the optical density of the area immediately below the image to determine the degree of ink washed from the image onto the adjacent area of the paper. When tested by this method, waterfastness of the yellow images was 99 to 100 percent (i.e., the optical density of the area immediately below the washed image was the same as the optical density of the unprinted paper) on both the XEROX® Image Series Elite paper and the Courtland 4024 paper.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises (a) water; (b) a colorant selected from the group consisting of reactive dyes having terminal vinyl sulfate groups and mixtures thereof; (c) N,N'-bis(3-aminopropyl)-1,2-ethylenediamine; (d) imidazole; (e) phosphorous acid or a phosphite salt; (f) tripropylene glycol monomethyl ether; and (g) a salt selected from the group consisting of $Zn^{2+}$ salts and mixtures thereof.

2. An ink composition according to claim 1 wherein the salt is selected from the group consisting of zinc chloride, zinc bromide, zinc iodide, zinc nitrate, zinc sulfate, zinc citrate, zinc salt of N,N-dimethylaminoethoxide, zinc salt of ethylene diamine tetraacetic acid, and mixtures thereof.

3. An ink composition according to claim 1 wherein the salt is zinc chloride.

4. An ink composition according to claim 1 wherein the dye is Reactive Red 180.

5. An ink composition according to claim 1 wherein the dye is Reactive Yellow 37.

6. An ink composition according to claim 1 wherein the $Zn^{2+}$ salt is present in the ink in an amount of from about 0.1 to about 20 percent by weight of the ink.

7. An ink composition according to claim 1 wherein the $Zn^{2+}$ salt is present in the ink in an amount of from about 0.5 to about 10 percent by weight of the ink.

8. An ink composition according to claim 1 wherein the $Zn^{2+}$ salt is present in the ink in an amount of from about 2 to about 6 percent by weight of the ink.

9. An ink composition according to claim 1 wherein the tripropylene glycol monomethyl ether is present in the ink in an amount of from about 2 to about 25 percent by weight of the ink.

10. An ink composition according to claim 1 wherein the ink contains phosphite ions in an amount of from about 0.075 to about 7.5 percent by weight of the ink.

11. An ink composition according to claim 1 wherein the imidazole is present in an amount of from about 1 to about 25 percent by weight of the ink.

12. An ink composition according to claim 1 wherein the N,N'-bis(3-aminopropyl)-1,2-ethylenediamine is present in an amount of from about 0.05 to about 5 percent by weight of the ink.

13. An ink composition according to claim 1 wherein the dye is present in an amount of from about 0.5 to about 15 percent by weight of the ink.

14. An ink composition according to claim 1 wherein the dye is present in an amount of from about 1 to about 10 percent by weight of the ink.

15. An ink composition prepared by admixing (a) water; (b) a colorant selected from the group consisting of reactive dyes having terminal vinyl sulfate groups and mixtures thereof; (c) N,N'-bis(3-aminopropyl)-1,2-ethylenediamine; (d) imidazole; (e) phosphorous acid; (f) tripropylene glycol monomethyl ether; and (g) a salt selected from the group consisting of $Zn^{2+}$ salts and mixtures thereof.

16. A process which comprises (i) incorporating into an ink jet printing apparatus an ink composition according to claim 15; and (ii) causing droplets of the ink composition to be ejected in an imagewise pattern onto a substrate.

17. A process according to claim 16 wherein the printing apparatus employs a thermal ink jet process wherein the ink in the nozzles is selectively heated in an imagewise pattern, thereby causing droplets of the ink to be ejected in imagewise pattern.

18. A process which comprises (i) incorporating into an ink jet printing apparatus an ink composition according to claim 1; and (ii) causing droplets of the ink composition to be ejected in an imagewise pattern onto a substrate.

19. A process according to claim 18 wherein the printing apparatus employs a thermal ink jet process wherein the ink in the nozzles is selectively heated in an imagewise pattern, thereby causing droplets of the ink to be ejected in imagewise pattern.

* * * * *